Sept. 21, 1971 C. D. LOYD 3,606,968
FRICTION WELDING CHUCK ASSEMBLY
Filed May 1, 1969 2 Sheets-Sheet 1

INVENTORS
CALVIN D. LOYD

BY
Fryer, Zimmerle, Feix, Phillips & Lempio
ATTORNEYS

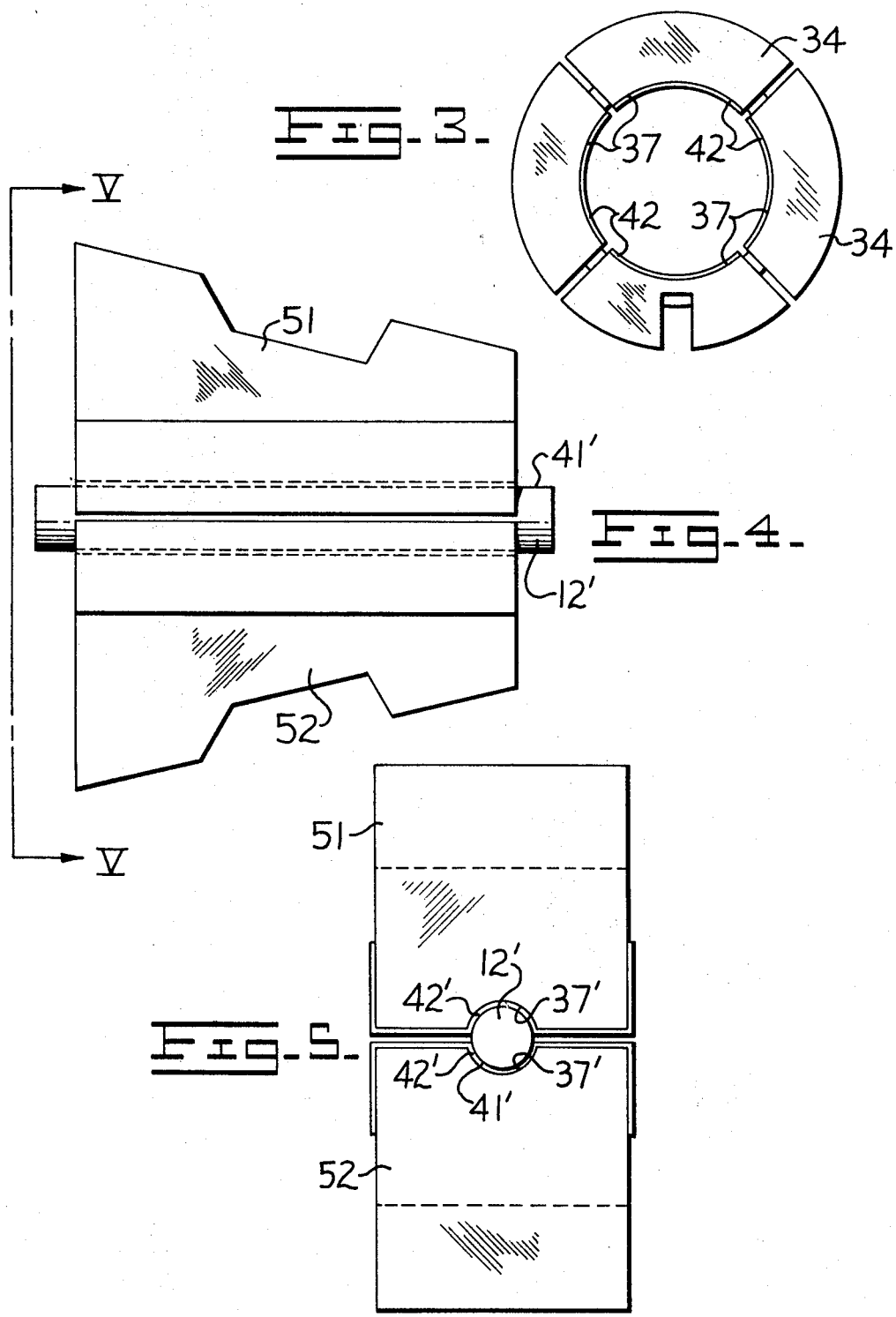

United States Patent Office 3,606,968
Patented Sept. 21, 1971

3,606,968
FRICTION WELDING CHUCK ASSEMBLY
Calvin D. Loyd, Peoria, Ill., assignor to
Caterpillar Tractor Co., Peoria, Ill.
Filed May 1, 1969, Ser. No. 821,053
Int. Cl. B23k 27/00
U.S. Cl. 228—2                                    15 Claims

ABSTRACT OF THE DISCLOSURE

A chuck assembly within a friction welding machine for securing one of a pair of weld pieces which are relatively rotated and urged into axial engagement to bond them together at a common interface. With at least one of the weld pieces having a relatively high-finished surface subject to marring, a chuck assembly for securing the one weld piece includes a chucking member generally conforming with the surface of the weld piece. Elastomeric material of selected thickness is arranged upon the chucking member to engage the weld piece to prevent contact between the weld piece and chucking member, while precisely controlling axial, radial and rotational alignment of the weld piece within the chucking member.

---

Within a conventional friction welding process, two weld pieces are secured in axial alignment with respect to each other in respective chuck assemblies of a friction welding machine. The weld pieces are then relatively rotated and urged into axial engagement under very substantial forces in order to raise a common interface of the weld pieces to a suitable temperature for accomplishing a bond between the weld pieces at their interface.

For purposes of illustration, the general welding parameters for bonding together a pair of steel bars having a diameter of approximately two inches may be considered. Within such a process, it is necessary to urge the two weld pieces into axial engagement with an axial thrust of approximately 70,000 lbs. while also rotating the weld pieces relative to each other under a torque force of approximately 1400 lb.-ft. This example is set forth herein only for the purpose of generally illustrating the magnitude of forces which must be applied to the weld pieces during a friction welding operation. Since the weld pieces are respectively secured within chuck assemblies, forces of the magnitude referred to above must necessarily be transferred between the weld pieces and the respective chuck assemblies during the welding operation.

In further consideration of the friction welding operation, it is noted that the operating parameters for the process, including forces of the magnitude referred to above, must be closely controlled in order to permit accurate reproduction of an effective bond between weld pieces having given properties. In addition, the weld pieces must be maintained in very accurate axial alignment within their respective chuck assemblies in order to permit suitable control over the configuration of a finished product formed by bonding of the two weld pieces.

To properly carry out all of the functions described above, the prior art has contemplated the employment of chuck assemblies including collets or jaws which firmly grip the weld pieces in order to maintain proper alignment of the weld pieces while applying axial thrust and torque forces of the magnitude set forth above. Since the jaws or other chucking members are normally made of very hard materials such as steel, it necessarily follows that tightening of the chucking members sufficiently to firmly grip the weld pieces tends to leave marks upon the surface of the weld pieces following the welding operation.

With the increasing use of friction welding machines for bonding together two pieces, it is desirable that the process be adapted for the bonding of weld pieces having a finished or semi-finished surface. Such weld pieces may include those plated with materials such as chromium or polished by various machine operations for example. In order to adapt the friction welding process to weld pieces of this type, it is necessary that they be firmly secured within a chuck assembly in accordance with the above discussion while being free from mars or scratches upon their finished surfaces following completion of the welding operation.

Still further, where at least one of the weld pieces is of the type having a finished surface, it may be even more essential that the axial alignment between two weld pieces be maintained during the welding operation since further finishing of the bonded product may not be contemplated. For example, where a friction welding operation is employed to join together the piston rod of a hydraulic cylinder, they must be joined in very accurate alignment for proper association with the hydraulic cylinder. Bonding of pieces such as those described above has heretofore been considered very difficult if not impossible because of the considerations set forth above.

Accordingly, it is an object of the present invention to provide a chuck assembly as part of a friction welding machine for securing a finished weld piece which is to be bonded to another weld piece. This object is made possible within the present by adapting chucking means withing the chuck assembly which have a plurality of surfaces movable into closely conforming, spaced apart relation with the finished surface of the weld piece. Deformable material such as a resilient elastomer is disposed upon the surfaces of the chucking means to prevent contact between the chucking means and the weld piece while maintaining the weld piece in accurate alignment within the chucking means and positively transferring large torque and axial thrust forces between the chucking means and the weld piece. Although a resilient elastomeric material of controlled thickness has been found to be particularly suitable for use upon the surfaces of the chucking means, other deformable materials having generally similar characteristics may also be employed satisfactorily.

Apparatus for fulfilling the above objects and advantages of the present invention are believed to be fully illustrated and additional objects and advantages of the invention made apparent by the following description having reference to the accompanying drawings.

BRIEF DESCRIPTION OF THE DRAWINGS

In the drawings:

FIG. 3 is an end view of a collet sleeve employed within the chuck assembly of FIG. 2 taken from its receiving end which may be seen at the rightward side of FIG. 2;

FIG. 4 is a longitudinal view of a pair of tapered block jaws which may be employed within a chuck assembly of a friction welding machine and represents another embodiment of the invention; and FIG. 5 is a view taken along section line V—V of FIG. 4.

Figure 1:
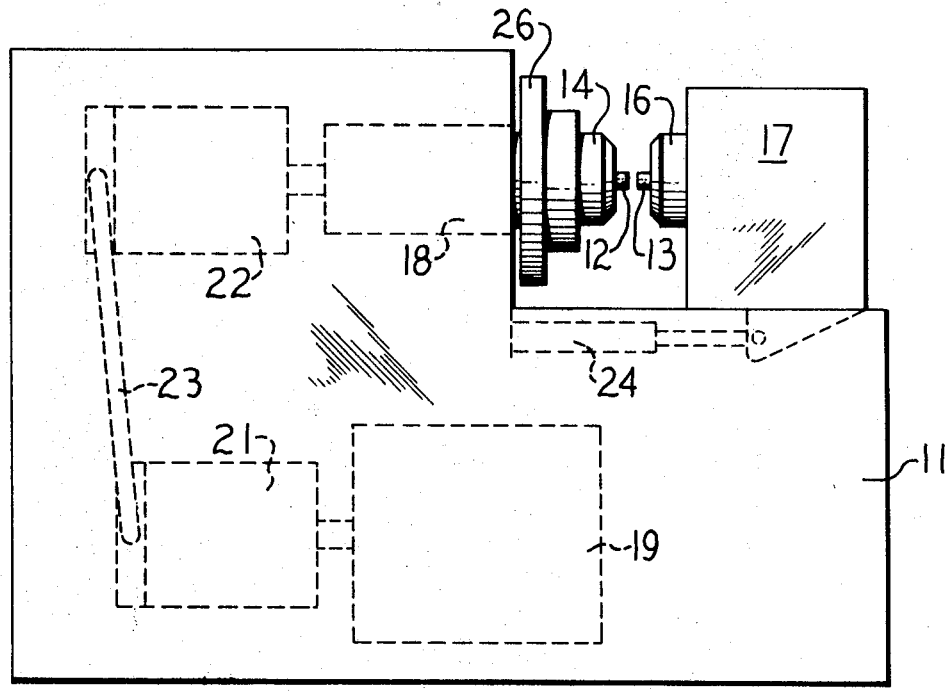
FIG. 1 is a partially schematic side elevation view of a friction welding machine.

A typical friction welding machine as contemplated by the present invention is shown in FIG. 1 and includes a frame 11 for supporting the various components of the machine. A pair of weld pieces 12 and 13 are secured in accurate axial alignment by respective chuck assemblies 14 and 16.

The chuck assembly 16 is mounted upon a tail stock assembly 17 for securing the weld piece 13 against rotation. The chuck assembly 14 is secured to a spindle 18 which is rotatably mounted upon the frame 11. One of the chuck assemblies, for example that indicated at 14, is described in greater detail below having reference to FIGS. 2–5.

To rotate the weld piece 12 relative to the weld piece 13, an electric motor 19 rotates the spindle 18 through a hydrostatic transmission including a hydraulic pump 21, a hydraulic motor 22 and a manifold 23 between the pump and motor. The rotational speed at which the spindle is driven by the motor 19 may be varied or terminated by changing cam angles in either pump 21 or the motor 22.

To provide for axial engagement between the weld pieces 12 and 13, the tailstock assembly 17 is mounted for axial movement upon the machine frame 11 under the control of a load cylinder 24. Force with which the pieces 12 and 13 are axially engaged may be determined by a pressure control circuit (not shown) which regulates pressure within the load cylinder 24. To adapt the friction welding machine for inertia welding operation, a variable inertia mass such as the flywheel weight 26 may be associated for rotation with the spindle 18, chuck assembly 14 and weld piece 12.

The welding machine described with reference to FIG. 1 is set forth only for purposes of illustration. Numerous other arrangements are known within the prior art for relatively rotating the weld pieces 12, 13 and urging them into axial engagement while being secured in their respective chuck assemblies 14, 16. Operating parameters for a friction welding machine of the type illustrated in FIG. 1 are well known in the prior art for selecting the axial thrust force applied to the weld pieces as well as the mass of the fly weight 26 and the initial rotation speed. The weld torque may be reliably predicted from these parameters.

Figure 2:
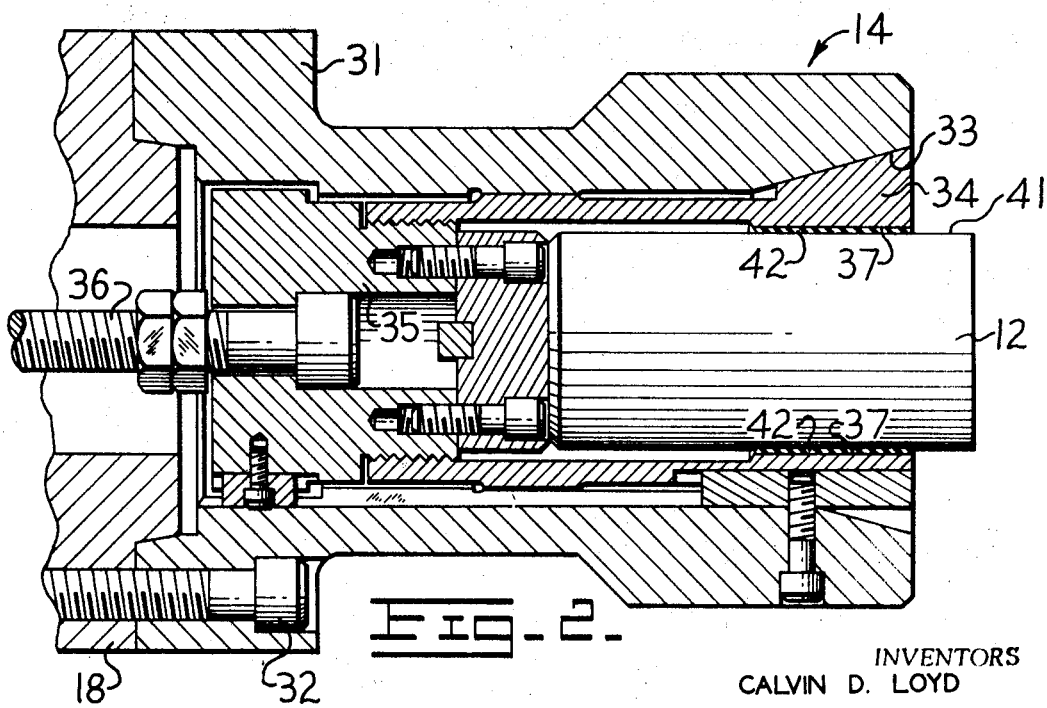
FIG. 2 is an axially sectioned view of a chuck assembly as a part of the friction welding machine of FIG. 1 to secure a finished weld piece.

The present invention is particularly concerned with construction of at least one of the chuck assemblies, for example that indicated at 14 in FIG. 1 and also shown in greater detail in FIG. 2. The chuck assembly 14 includes a housing 31 secured to the spindle 18 by cap screws indicated at 32 for example, with a tapered bore 33 being formed in the housing to receive a split collet sleeve 34 also shown in FIG. 3. The collet sleeve 34 is adapted to receive the weld piece 12 and to be urged inwardly of the housing 31 for example by a draw bar 36 through an intermediate member 35. Surfaces 37 thereby tend to be constricted or collapsed inwardly upon the weld piece 12 to provide for firm engagement of the weld piece 12 by the sleeve 34. The weld piece 12 is released from the chuck assembly 14 by shifting the draw bar rightwardly as viewed in FIG. 2 and moving the collet sleeve 34 relatively outwardly from the housing 31.

The present invention is particularly concerned with construction of the chuck assembly 14 to adapt it for use where the weld piece 12 has a relatively high finish on its surface 41 which is engaged by the chuck assembly 14. To permit the chuck assembly to firmly secure the weld piece 12 during a welding operation of the type referred to above while not marring or scratching the surface 41, the surfaces 37 of the collet sleeve 34 are contoured in generally close conformity with the surface 41 of the weld piece 12. As may be best seen from FIG. 3, the sleeve 34 is also configured so that its surfaces 37 conform with a substantial circumferential portion of the surface 41 of the weld piece 12 (also see FIG. 2).

A deformable material of resilient elastomeric composition is indicated at 42 as being affixed to the surfaces 37 of the collet sleeve 34. It is particularly important that the characteristics of the elastomeric material 42, particularly its thickness, be selected so that it serves to maintain the weld piece 12 in accurately aligned, spaced apart relation from the sleeve 34. The material 42 must also be capable of positively transferring large torque and axial thrust forces between the sleeve 34 and weld piece 12 during bonding of the two weld pieces 12, 13 in a manner described above.

In order to carry out this purpose, the material 42 is particularly contemplated as having an elastomeric composition which, when compressed between the sleeve 34 and weld piece 12, has a thickness of no more than approximately 0.062 inch. It has been found that the elastomeric material 42 is most suitable for carrying out these purposes when its thickness is maintained within an approximate range of 0.002 and 0.062 inch.

To set forth a further preferred description of the elastomeric material 42, it is contemplated as having a composition for example of polyurethane which may be applied as a liquid to the surfaces 37 of the sleeve 34. The liquid elastomer is preferably applied to the surfaces 37 for example by painting or spraying and then dried or cured in an oven for example. When the elastomeric material 42 is applied as a liquid, its thickness is preferably maintained within an approximate range of 0.002 and 0.020 inch. It has been found that, when the elastomeric material is applied as a liquid, it has been particularly effective with a thickness in the approximate range of 0.002 and 0.005 inch. The elastomeric material is also particularly contemplated as having a Shore hardness within the approximate range of A40 and D70.

The elastomeric material may also be employed as sheet stock which is secured to the surfaces 37 of the sleeve 34. When the elastomeric material is applied as a sheet, it is preferably maintained with a maximum thickness of approximately 0.062 inch.

When the material 42 is selected and applied in accordance with the above, it has been found to be sufficiently thick to prevent contact between the sleeve 34 and weld piece 12 while being effective for maintaining accurate axial and radial alignment of the weld piece 12 while positively transferring large forces between the chuck assembly 14 and the weld piece 12.

Another embodiment of chucking means for securing a weld piece within a chuck assembly such as that indicated at 14 in FIG. 2 is illustrated in FIGS. 4 and 5. As illustrated in those figures, a plurality of tapered block jaws, for example, those indicated at 51 and 52 may be employed as chucking means in place of the collet sleeve 34. The block jaws 51, 52 may be associated with a chuck assembly generally similar to that indicated at 14 in FIG. 2. Operation is also generally similar to that described above with reference to the chuck assembly 14 in both FIGS. 1 and 2. Features of the embodiment illustrated in FIGS. 4 and 5 which correspond to features of the embodiment shown for example in FIGS. 2 and 3 are indicated by primed numerals to better facilitate a comparison between the two embodiments.

Referring now to both FIGS. 4 and 5, the block jaws 51, 52 form cylindrical surfaces 37' which similarly conform with the finished surface 41' of the weld piece 12'. The combined surfaces 37' of the two block jaws 51, 52 also similarly conform to a substantial cylindrical portion of the finished weld piece surface 41' as is best seen in FIG. 5.

Deformable material of resilient elastomeric composition is indicated at 42' upon the block jaws 51, 52. The elastomeric material 42' is arranged upon the block jaws to particularly cover the entire surfaces 37', which conform closely with the finished surface 41' of the weld piece 12'. The elastomeric material 42' is otherwise similar in all respects to the elastomeric material 42 shown in FIGS. 2 and 3, including characteristics of the elastomeric material 42 as described above.

What is claimed is:

1. A friction welding machine for joining two weld pieces by urging them into axial engagement and setting them into relative rotation to accomplish a bond at a common interface of the weld pieces, one of the weld pieces being generally cylindrical and having a surface of relatively high finish subject to marring, a chuck assembly for securing the one weld piece and applying large torque and axial thrust forces upon the one weld piece during bonding of the weld pieces, the chuck assembly comprising chuck means for gripping the high finish surface of the one weld piece, said chucking means having a plurality of surfaces movable into closely conforming, spaced apart relation with the high finish surface of the one weld piece and deformable material disposed on the surfaces said deformable material being deformable between the chucking means surfaces and the high finish weld piece surface to a thickness within a range of approximately 0.002 to 0.062 inch, said deformable material maintaining the one weld piece in accurately aligned, spaced apart relation from the chucking means and positively transferring large torque and axial thrust forces between the chucking means and one weld piece during bonding of the two weld pieces.

2. In a friction welding machine for joining two weld pieces by urging them into axial engagement and setting them into relative rotation to accomplish a bond at a common interface of the weld pieces, one of the weld pieces being generally cylindrical, a chuck assembly for securing the one weld piece and applying large torque and axial thrust forces upon the one weld piece during bonding of the weld pieces, the chuck assembly comprising chucking means for gripping the one weld piece, said chucking means having a plurality of surfaces movable into closely conforming, spaced apart relation, with the one weld piece and resilient elastomeric material disposed on the surfaces, said elastomeric material being deformable between the chucking means surfaces and the one weld piece to a thickness of no more than approximately 0.062 inch, aid elastomeric material maintaining the one weld piece in accurately aligned, spaced apart relation from the chucking means and capable of positively transferring large torque and axial thrust forces between the chucking means and one weld piece during bonding of the two weld pieces, the surface of the chucking means conforming with a substantial surface portion of the one weld piece.

3. The invention of claim 2 wherein the chuck assembly is a collet chuck and the chucking means comprises a split collet sleeve.

4. The invention of claim 2 wherein the chucking means comprises a plurality of block jaws.

5. The invention of claim 2 wherein the elastomeric material has a thickness within the approximate range of 0.002 and 0.062 inch.

6. The invention of claim 5 wherein the elastomeric material is applied to the surfaces of said chucking means as a liquid and has a thickness within the approximate range of 0.002 and 0.020 inch.

7. The invention of claim 6 wherein the elastomeric material has a maximum thickness of approximately 0.005 inch.

8. The invention of claim 6 wherein the elastomeric material is composed of polyurethane.

9. The invention of claim 8 wherein the elastomeric material has a Shore hardness within an approximate range of A40 and D70.

10. The invention of claim 2 wherein the elastomeric material is sheet material arranged upon the surfaces of the chuck means, the sheet material having a thickness of no more than approximately 0.062 inch.

11. The invention of claim 2 wherein the elastomeric material has a Shore hardness within an approximate range of A40 and D70.

12. The invention of claim 2 wherein the elastomeric material is composed of polyurethane.

13. A friction welding machine comprising two chuck assemblies for securing two weld pieces in axial alignment, means associated with the chuck assemblies for relatively rotating the chuck assemblies and urging them toward each other for bonding the weld pieces at an interface therebetween with large torque and axial thrust forces being transferred between the weld pieces and respective chuck assemblies, one of the workpieces having an outer surface subject to marring, one of the chuck assemblies for securing the one weld piece including chucking means for gripping the surface of the one weld piece, said chucking means including surfaces closely conforming with a substantial circumferential portion of the surface of the one weld piece and elastomeric material arranged on the surfaces of said chucking means for engagement with the weld piece surface, the elastomeric material having a thickness within an approximate range of 0.002 to 0.062 inch for maintaining the chucking means surfaces in spaced apart relation from the weld piece surface during bonding of the weld pieces while accurately maintaining the one weld piece in axial alignment with the other weld piece and substantially preventing relative rotation between the one weld piece and said chucking means.

14. The invention of claim 13 wherein the chuck assembly is a collet chuck and the chucking means comprises a split collet sleeve.

15. The invention of claim 13 wherein the chucking means comprises a plurality of block jaws.

References Cited

UNITED STATES PATENTS

| | | | |
|---|---|---|---|
| 3,512,792 | 5/1970 | Farley et al. | 279—51 |
| 3,478,411 | 11/1969 | Goloff et al. | 228—2 |
| 2,961,247 | 11/1960 | Ziaylek, Jr. | 279—51X |
| 2,820,640 | 1/1958 | Regan | 279—41 |
| 2,666,352 | 1/1954 | Philips | 81—38 |

JOHN F. CAMPBELL, Primary Examiner

R. J. CRAIG, Assistant Examiner

U.S. Cl. X.R.

29—470.3; 279—41, 51, 1(SJ)

UNITED STATES PATENT OFFICE
CERTIFICATE OF CORRECTION

Patent No. 3,606,968　　　　　　　　　Dated September 21, 1971

Inventor(s) Calvin D. Loyd

It is certified that error appears in the above-identified patent and that said Letters Patent are hereby corrected as shown below:

Column 2, Line 19, after "piston" insert --and--.

Column 2, Line 29, after "present" insert --invention--.

Column 6, Line 8, "chuck" should be --chucking--.

Signed and sealed this 22nd day of August 1972.

(SEAL)
Attest:

EDWARD M. FLETCHER, JR.
Attesting Officer

ROBERT GOTTSCHALK.
Commissioner of Patents